United States Patent Office 3,641,035
Patented Feb. 8, 1972

3,641,035
PESTICIDAL COMPOUNDS AND COMPOSITIONS CONTAINING THEM
Nigel Douglas Bishop, Winnersh, and Joan Irene Masters, Crowthorne, England, assignors to Imperial Chemical Industries Limited, London, England
No Drawing. Filed May 18, 1970, Ser. No. 38,541
Claims priority, application Great Britain, May 28, 1969, 26,922/69
Int. Cl. C07d 51/38
U.S. Cl. 260—256.4 C        2 Claims

ABSTRACT OF THE DISCLOSURE

Bis pyrimidine derivatives having the formula:

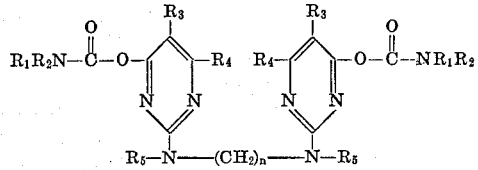

wherein $R_1$, $R_2$, $R_3$, $R_4$ and $R_5$ are lower alkyl groups, or $R_3$ and $R_4$ are hydrogen atoms and $n$ is an integer having a value of from 1 to 6, and compositions containing said derivatives to combat pests.

This invention relates to bis-pyrimidinyl carbamates, to processes for preparing them, to pesticidal compositions containing them and to methods of combating plant pests using them.

Accordingly this invention provides, as new compounds, bis-pyrimidinyl compounds having the general formula:

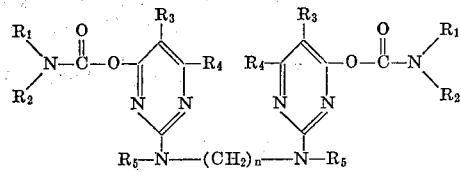

wherein $R_1$, $R_2$, $R_3$, $R_4$ and $R_5$ are lower alkyl groups, or $R_3$ and $R_4$ are hydrogen atoms, and $n$ is an integer having a value of from 1 to 6.

In this specification the term "lower alkyl group" is intended to include alkyl groups containing from 1 to 6 carbon atoms.

An especially useful compound according to the invention has the structural formula:

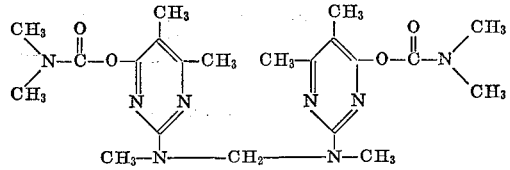

It is a white crystalline material having a melting point of 181° C.

In a further aspect the invention provides a process for preparing the compounds of the present invention which comprises reacting a pyrimidine compound having the formula:

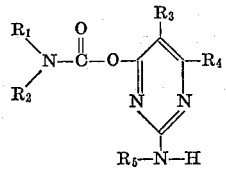

wherein $R_1$, $R_2$, $R_3$, $R_4$ and $R_5$ represent lower alkyl groups, or $R_3$ and $R_4$ are hydrogen atoms, with either (a) formaldehyde, to yield an invention compound having the formula:

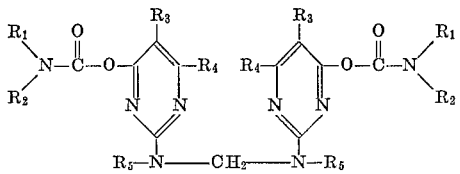

or (b) an α,ω-dihaloalkane having the formula:

Hal—(CH₂)ₙ—Hal wherein Hal represents an atom of halogen and $n$ is an integer having a value of from 1 to 6, to yield an invention compound having the formula:

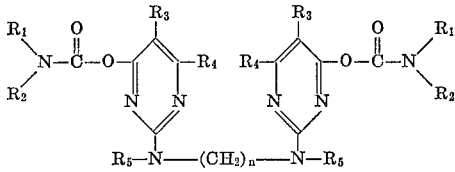

This latter reaction may optionally be carried out in the presence of a base to remove the hydrogen halide formed during the reaction.

It is convenient to use formaldehyde in the form of an aqueous solution containing approximately 40% w./w. of formaldehyde.

The above reactions may be carried out in a diluent or solvent, and may be accelerated by the application of heat.

The compounds of this invention are very toxic towards a variety of insect pests, particularly the following:

*Tetranychus telarius*: (red spider mites)
*Aphis fabae*: (black aphids)
*Megoura viciae*: (green aphids)

A particularly useful feature of the activity of the invention compounds is their ability to act as systemic pesticides, that is to say, their ability to move in a plant to combat an infection or infestation thereon remote from a site of initial application of a compound. Thus a compound of the invention, or a composition containing the same, may be applied to the soil surrounding the roots of a plant and taken up by the plant through its roots to combat pests on the plant.

The invention further consists in pesticidal compositions comprising as an active ingredient a compound as defined above.

In use, the invention compounds, or compositions containing them, may be applied in a variety of ways. Thus their application can suitably be directed onto the foliage of the plant or to infected and/or infested areas thereof; alternatively the soil surrounding the plant can be treated with the invention compounds or compositions containing them. If desired the seeds themselves can be similarly treated.

According to a further feature therefore we provide a method of combating undesired pests on plants which comprises applying to the locus of the plant a compound, or composition containing the same, as hereinbefore defined.

In a further aspect the invention provides a method of combating pests on plants which comprises applying to the plants or to seeds thereof a compound or composition as hereinbefore defined. The invention further includes a method of treating agricultural soil which comprises applying to the soil a compound or a composition as hereinbefore defined.

In a yet further aspect the invention includes a method of combating pests which comprises applying to the pests or to a pest habitat a compound or composition as hereinbefore defined.

The compounds and compositions of the invention may be used for agricultural or horticultural purposes and the compound or type of composition used in any instance will depend upon the particular purpose for which it is to be used.

Compositions comprising the invention compounds may be in the form of dusting powders or granules wherein the active ingredient is mixed with a solid diluent or carrier. Suitable solid diluents or carriers may be, for example, kaolinite (china clay) montmorillonite, attapulgite, talc, pumice, silica, calcium carbonate, gypsum, powdered magnesia, fuller's earth, Hewitt's earth and diatomaceous earth. Compositions for dressing seed, for example, may comprise an agent assisting the adhesion of the composition to the seed, for example, a mineral oil.

The composition may also be in the form of dispersible powders of grains comprising, in addition to the active ingredient, a wetting agent to facilitate the dispersion of the powder or grains in liquid. Such powders or grains may include fillers, suspending agents and the like.

The compositions may also be in the form of liquid preparations to be used as dips or sprays which are generally aqueous dispersions or emulsions containing the active ingredient in the presence of one or more wetting agents, dispersing agents, emulsifying agents or suspending agents.

Wetting agents, dispensing agents and emulsifying agents may be of the cationic, anionic, or non-ionic type. Suitable agents of the cationic type include, for example, quaternary ammonium compounds, for example, cetyltrimethylammonium bromide. Suitable agents of the anionic type include, for example, soaps, salts of aliphatic monoesters of sulphuric acid, for example sodium lauryl sulphate, salts of sulphonated aromatic compounds, for example sodium dodecylbenzenesulphonate, sodium, calcium or ammonium lignosulphonate, butylnaphthalene sulphonate, and a mixture of the sodium salts of di-isopropyl- and triisopropylnaphthalene sulphonic acids.

Suitable agents of the non-ionic type include, for example, the condensation products of ethylene oxide with fatty alcohols such as oleyl alcohol or cetyl alcohol, or with alkyl phenols such as octylphenol, nonylphenol and octylcresol. Other non-ionic agents are the partial esters derived from long chain fatty acids and hexitol anhydrides, the condensation products of the said partial esters with ethylene oxide, the lecithin abd block copolymers of ethylene oxide and propylene oxide.

Suitable suspending agents are, for example, bentonite, pyrogenic silica, and hydrophilic colloids, for example polyvinylpyrrolidone and sodium carboxymethylcellulose, and the vegetable gums, for example gum acacia and gum tragacanth.

The aqueous solutions dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are ethylene dichloride, isopropyl alcohol, propylene glycol, diacetone alcohol, toluene, kerosene, methylnaphthalene, xylenes and trichloroethylene.

The compounds of the invention may also be formulated into compositions comprising capsules or microcapsules containing either the active ingredient itself, or a composition containing the active ingredient itself, or a composition containing the active ingredient, and prepared by any of the known encapsulation or microencapsulation techniques.

The compositions to be used as sprays may also be in the form of aerosols wherein the formulation is held in a container under pressure in the presence of a propellant such as fluorotrichlormethane or dichlorodifluoromethane.

By the inclusion of suitable additives, for example, for improving the distribution, adhesive powder and resistance to rain on treated surfaces, the different compositions can be better adapted for the various uses for which they are intended.

The compounds of this invention may also be conveniently formulated by admixing them with fertilizers. A preferred composition of this type comprises granules of fertilizer material incorporating, for example coated with, a compound of the invention. The fertilizer material may, for example, comprise nitrogen or phosphate-containing substances.

In yet a further aspect of the invention, therefore, we provide a fertilizer comprising a compound of the invention as hereinbefore defined.

The compositions which are to be used in the form of aqueous dispersions or emulsions are generally supplied in the form of a concentrate containing a high proportion of the active ingredient or ingredients, the said concentrate to be diluted with water before use.

These concentrates are often required to withstand storage for prolonged periods and after such storage, to be capable of dilution with water in order to form aqueous preparations which remain homogeneous for a sufficient time to enable them to be applied by conventional spray equipment. The concentrates may conveniently contain from 10–85% by weight of the active ingredient or ingredients and generally from 25–60% by weight of the active ingredient or ingredients. When diluted to form aqueous preparations, such preparations may contain varying amounts of the active ingredient or ingredients depending upon the purpose for which they are to be used, but an aqueous preparation containing between 0.0001% and 1.0% by weight of active ingredient or ingredients may be used.

It is to be understood that the pesticidal compositions of this invention may comprise, in addition to a compound of the invention, one or more other compounds having biological activity.

The invention is illustrated, but not limited, by the following examples.

EXAMPLE 1

This example illustrates the preparation of 2,2'(N,N'-dimethylmethylenediamino) bis(5,6-dimethylpyrimidin-4-yl dimethylcarbamate), having the structure:

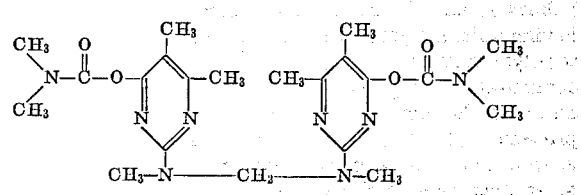

A mixture of 4,5-dimethyl-2-methylamino-4-pyrimidinyl dimethylcarbamate (3.4 g.) and 40% formaldehyde solution (10 cc.) was warmed together to achieve complete solution. After standing for 1 hour at room temperature the mixture was extracted with chloroform, the chloroform extracts dried over anhydrous sodium sulphate and the solvent evaporated to yield a viscous oil. From this oil a white solid was observed to precipitate. After 15 days ether was added to the mixture, and the solid collected by filtration and recrystallised from alcohol to yield 2,2'(N,N'-dimethylmethylenediamino) bis(5,6 - dimethylpyrimidin-4-yl dimethylcarbamate) having a melting point of 181° C.

EXAMPLE 2

This example illustrates an atomisable fluid comprising a mixture consisting of 25% by weight of the product of Example 1 and 75% by weight of xylene.

EXAMPLE 3

This example illustrates a dusting powder which may be applied directly to plants or other surfaces and comprises 1% by weight of the product of Example 1 and 99% by weight of talc.

EXAMPLE 4

25 parts by weight of the product described in Example 1, 65 parts by weight of xylene, and 10 parts of an alkyl aryl polyether alcohol ("Triton" X–100; "Triton" is a Trademark) were mixed in a suitable mixer. There was thus obtained an emulsion concentrate which can be mixed with water to produce an emulsion suitable for use in agricultural applications.

EXAMPLE 5

5 parts by weight of the product described in Example 1 were thoroughly mixed in a suitable mixer with 95 parts by weight of talc. There was thus obtained a dusting powder.

EXAMPLE 6

10 parts by weight of the product described in Example 1, 10 parts of an ethylene oxide-octylphenol condensate ("Lissapol" NX; "Lissapol" is a Trademark) and 80 parts by weight of diacetone alcohol were thoroughly mixed. There was thus obtained a concentrate which, on mixing with water, gave an aqueous dispersion suitable for application as a spray in the control of insect pests.

EXAMPLE 7

This example illustrates a concentrated liquid formulation in the form of an emulsion. The ingredients listed below were mixed together in the stated proportions and the whole stirred until the constituents were dispersed.

| | Percent wt. |
|---|---|
| Product of Example 1 | 20 |
| "Lubrol" L ("Lubrol" is a trademark) | 17 |
| Calcium dodecylbenzenesulphonate | 3 |
| Ethylene dichloride | 45 |
| "Aromasol" H ("Aromasol" is a trademark) | 15 |
| | 100 |

EXAMPLE 8

The ingredients listed below were ground together in the proportions stated to produce a powdered mixture readily dispersible in liquids.

| | Percent wt. |
|---|---|
| Product of Example 1 | 50 |
| Dispersol T ("Dispersol" is a trademark) | 5 |
| China clay | 45 |
| | 100 |

EXAMPLE 9

A composition in the form of grains readily dispersible in a liquid (for example water) was prepared by grinding together the first four of the ingredients listed below in the presence of water and then the sodium acetate was mixed in. The admixture was dried and passed through a British Standard mesh sieve, size 44–100 to obtain the desired size of grains.

| | Percent wt. |
|---|---|
| Product of Example 1 | 50.0 |
| Dispersol T | 12.5 |
| Calcium lignosulphonate | 5.0 |
| Sodium dodecylbenzenesulphonate | 12.5 |
| Sodium acetate | 20.0 |
| | 100 |

EXAMPLE 10

A composition suitable for use as a seed dressing was prepared by mixing all three of the ingredients set out below in the proportions stated.

| | Percent wt. |
|---|---|
| Product of Example 1 | 80 |
| Mineral oil | 2 |
| China clay | 18 |
| | 100 |

EXAMPLE 11

A granular composition was prepared by dissolving the active ingredient in a solvent, spraying the solution obtained onto the granules of pumice and allowing the solvent to evaporate.

| | Percent wt. |
|---|---|
| Product of Example 1 | 5 |
| Pumice granules | 95 |
| | 100 |

EXAMPLE 12

An aqueous dispersion formulation was prepared by mixing and grinding the ingredients recited below in the proportions stated.

| | Percent wt. |
|---|---|
| Product of Example 1 | 40 |
| Calcium lignosulphonate | 10 |
| Water | 50 |
| | 100 |

The following constitutes an explanation of the compositions or substances represented by the various trademarks and tradenames referred to in the foregoing examples.

"Lubrol" L is a condensate of 1 mole of nonyl phenol with 13 molar proportions of ethylene oxide.

"Aromasol" H is a solvent mixture of alkylbenzenes.

"Dispersol" T is a mixture of sodium sulphate and a condensate of formaldehyde with the sodium salt of naphthalene sulphonic acid.

"Triton" X–100 is an alkyl aryl polyether alcohol.

EXAMPLE 13

The toxicity of a compound of this invention towards a variety of insect pests was investigated and the tests conducted and results obtained are set out below. The compound of the invention was in each case used in the form of liquid preparations containing 0.1%, 0.025% or 0.0125% by weight of the compound. The preparations were made by dissolving the compound in a mixture of solvents consisting of 4 parts by volume of acetone and 1 part by volume of diacetone alcohol. The solutions were then diluted with water containing 0.01% by weight of a wetting agent sold under the trade name of "Lissapol" NX until the liquid preparations contained the required concentration of the compound ("Lissapol" is a trademark).

The test procedure adopted with regard to each test insect was basically the same and comprised supporting a number of the insects on some medium which may be a host plant or some foodstuff on which the insect feeds, and treating either or both the insect and the medium with the preparation. The mortality of the insects was then assessed at periods varying from two to three days after the treatment.

The results of the tests are given below in Table I. In the table the first column indicates concentration of the active ingredient used, expressed in parts per million (p.p.m.). Each of the subsequent columns indicates the name of the test insect and the number of days which were allowed to elapse after treatment before assessing the percentage of the insects which had been killed.

0 represents less than 30% kill.
1 represents from 30-49% kill.
2 represents from 50-90% kill.
3 represents over 90% kill.

TABLE I

| Compound of Example 1 concentration in p.p.m. | Aphiss fabae (black aphid)— broad bean, 2 days | Megoura viciae (green aphid)— broad bean, 2 days | Tetranychus telarius (red spider mite)— french bean, 3 days |
|---|---|---|---|
| 1,000 | 3 | 3 | 2 |
| 250 | 3 | 3 | |
| 125 | 3 | 3 | |

EXAMPLE 14

This example illustrates the superior performance of the compound of Example 1 over two insecticidal carbamate compounds in a persistance test to demonstrate residual activity. The compounds with which comparison was made have the Formulae I and II below.

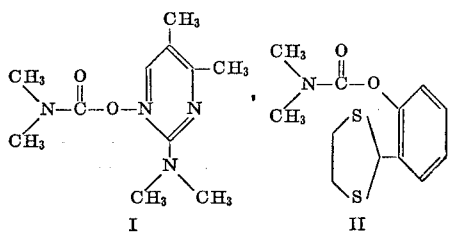

The compound represented by Formula I, which is described in a British patent specification, Ser. No. 1,181,657, is also known by the British Standards common name "pirimicarb," and the compound represented by Formula II is known by the number C13963.

In the test broad bean plants were sprayed with an aqueous composition containing 125 p.p.m. of the active ingredient. When dry, the plants were infested with adult female green aphids (*Macrosiphum pisum*). The mortality was assessed after 24 hours and the plants reinfested with more aphids. Another assessment of mortality was made after a further 24 hours, and reinfestation again carried out. A final assessment for mortality was made after a further 24 hours. The results are recorded in Table II below.

TABLE II

| | Percent mortality 24 hours after infestation | | |
|---|---|---|---|
| | 24 hours after spraying | 48 hours after spraying | 72 hours after spraying |
| Compound of Example 1 | 100 | 98 | 62 |
| Pirimicarb | 100 | 54 | 36 |
| C13963 | 100 | 60 | 31 |

These results clearly demonstrate the superior persistance of the compound of Example 1 over the previously known compounds.

What is claimed is:

1. Bis-pyrimidinyl compounds having the formula:

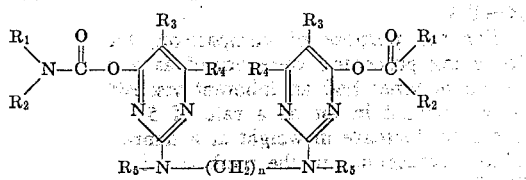

wherein $R_1$, $R_2$, $R_3$, $R_4$ and $R_5$ are lower alkyl groups containing from 1 to 6 carbon atoms, or $R_3$ and $R_4$ are hydrogen atoms, and $n$ is an integer having a value of from 1 to 6.

2. The compound having the formula:

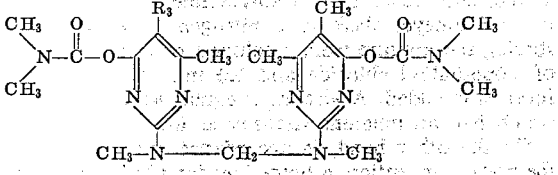

References Cited

UNITED STATES PATENTS 3,493,574  2/1970  Baranyovits et al. __ 260—256.4
3,496,180  2/1970  Porret et al. _____ 260—256.4

ALEX MAZEL, Primary Examiner
R. J. GALLAGHER, Assistant Examiner

U.S. Cl. X.R.

71—92; 260—327 M; 424—251